United States Patent Office 3,163,378
Patented Dec. 29, 1964

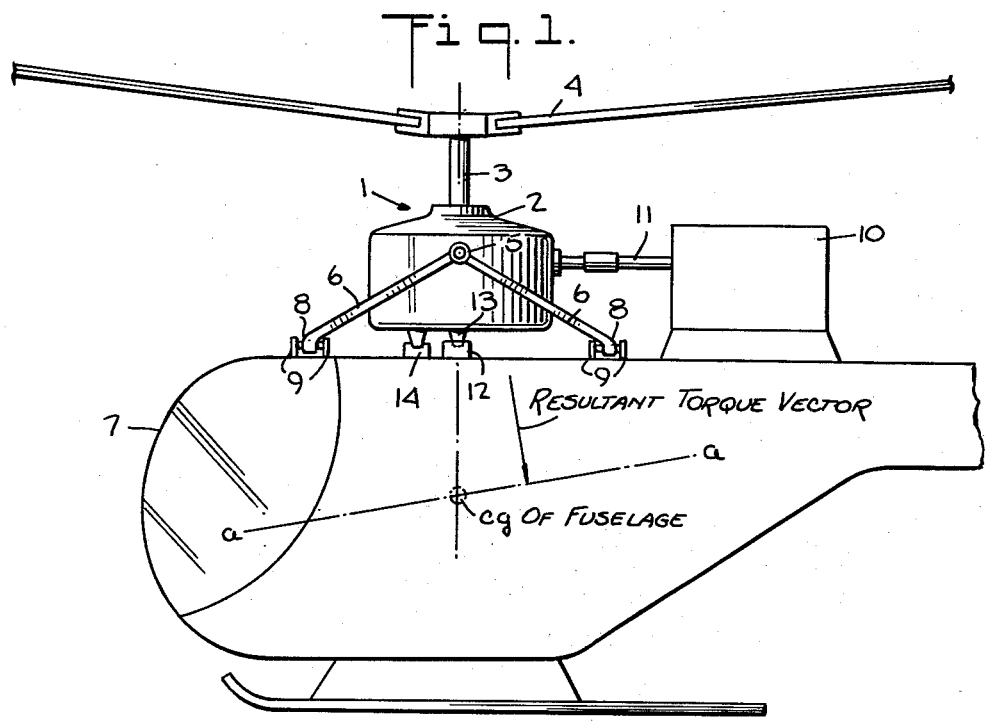
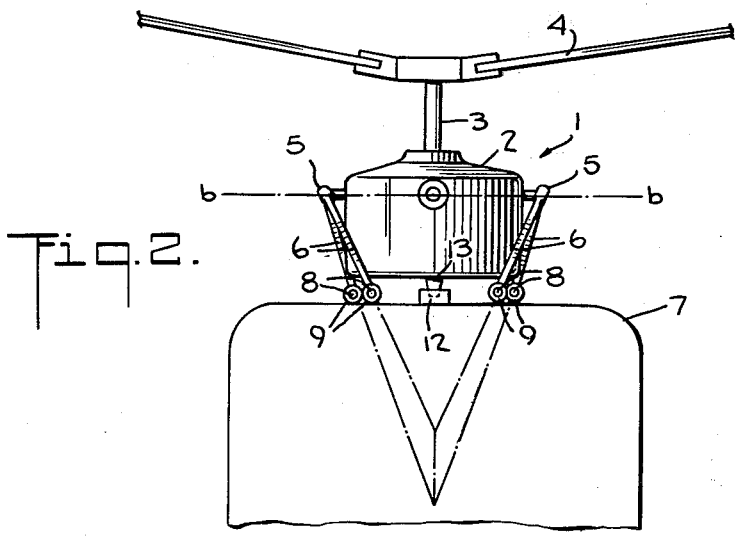

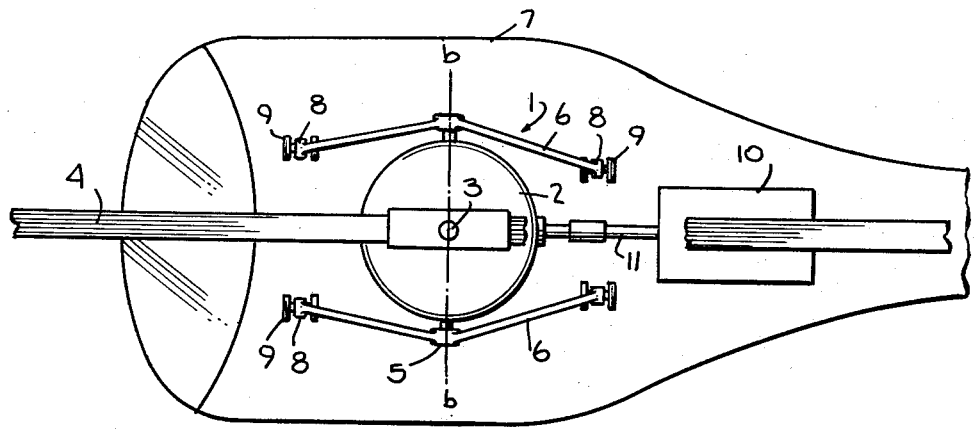
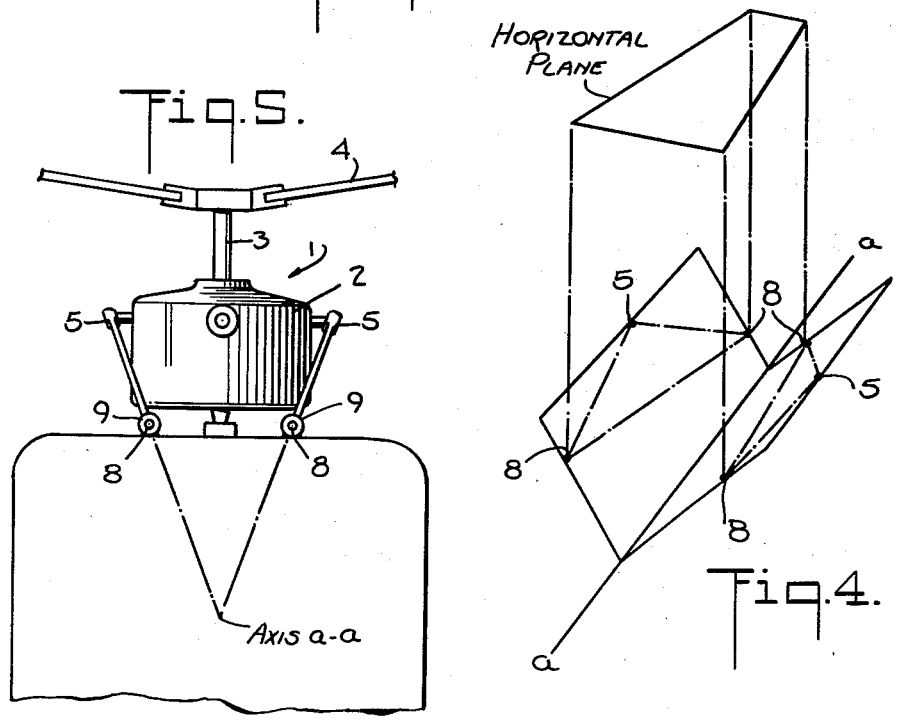

3,163,378
ROTARY WING AIRCRAFT PYLON MOUNTING
Rodney W. Balke, Jan M. Drees, and Robert L. Lichten, Dallas, Tex., assignors to Bell Aerospace Corporation, Wheatfield, N.Y., a corporation of Delaware
Filed Aug. 27, 1963, Ser. No. 304,783
19 Claims. (Cl. 244—17.27)

This invention relates to rotary wing aircraft and more particularly to the pylon mounting system thereof.

In rotary wing aircraft it is desirable to isolate the fuselage from the vibratory forces originating in the rotor. These forces originating in the rotor are transmitted to the fuselage in a degree depending upon the isolating qualities or effectiveness of the rotor and pylon mounting system. Effective vibration isolation permits higher forward speed and greater performance capability, provides a more comfortable ride, increases component service life and contributes significantly to the success of the rotary wing aircraft.

In rotary wing aircraft, such as a helicopter, where the pylon mounting structure is not rigidly attached to the fuselage, rubber or some material with highly elastic properties is normally interposed between the pylon and the fuselage. This permits the pylon to translate and/or rotate with respect to the fuselage in either or both the lateral and longitudinal planes within the limits permitted by the elasticity of the material employed. For example, in the engine-rotor support or pylon illustrated in U.S. Patent No. 2,615,657 the pylon is attached to the fuselage through elastic restraining devices so that the pylon or engine-rotor assembly will pivot about the pylon center of percussion. However, the pylon can move to some degree under varying rotor loads in any combination of translation and rotation with respect to the fuselage in both the lateral and longitudinal planes as a function of the elasticity of the elastic restraining devices. As a result of such movement, the axes of pylon rotation are not positively predetermined and established.

Other mounting systems may restrict either translation or rotation of the pylon system relative to the fuselage but generally do not restrain both translational and rotational movement simultaneously and in a given combination so as to positively define the axes of rotation. In addition, in order to accomplish restriction of translation or rotation they require mounting of the pylon structure in the area of the established axis of rotation.

It is an object of this invention to provide a rotor and pylon mounting system that acts to positively predetermine the axes of rotation of the pylon relative to the fuselage in both the longitudinal and lateral planes such that the pylon performs only prescribed rigid body motions with respect to the fuselage in all flight conditions.

It is an object of this invention to provide a pylon mounting system that will allow a minimum of fuselage response to oscillatory forces acting at the rotor hub in three perpendicular planes, namely, the vertical, lateral and longitudinal planes.

An additional object resides in a pylon mounting system that permits free selection of pylon centers of rotation while still confining the actual mounting structure to a limited area.

It is an object of this invention to provide the desired stiffness of the attachment of the pylon to the fuselage.

It is an object of this invention to provide a pylon mounting system which provides rigid restraint of the pylon against the engine torque about the axis of the engine output shaft and against rotor counter-torque about the vertical axis of the pylon.

Yet another object of this invention is to minimize misalignment of the engine-to-transmission drive shaft.

It is an object of this invention to provide a pylon mounting system that will partially restrain movement of the pylon in rotation about preselected centers or axes of rotation in the longitudinal and lateral planes.

A further object of this invention is to provide a pylon mounting system which readily allows for differences in spring rates restraining the pylon relative to the fuselage in translation or about the axes of rotation in the longitudinal and lateral planes.

Other objects and advantages of this invention will appear in the more detailed description that follows and in the drawings wherein:

FIGURE 1 is a side view of a helicopter that includes this invention;

FIGURE 2 is a rear view of the arrangement of FIGURE 1;

FIGURE 3 is a top view of the arrangement of FIGURE 1;

FIGURE 4 is a perspective drawing illustrating the relationship of the arrangement shown in FIGURES 1, 2 and 3; and FIGURE 5 is a schematic illustration of lateral upsetting forces acting upon a pylon mounting system.

Referring to FIGURES 1 and 2, the pylon system 1, consisting of the transmission 2, mast 3 and rotor 4, is supported through a pair of ball joints or bearings 5, forming axis *b—b*, connected to a pair of inverted V-shaped support arms 6. The lower or base ends of the support arms 6 are attached to the fuselage 7 through ball joints or bearings 8 disposed between the support arms 6 and brackets 9 integrally attached to the fuselage. As shown in the drawings, the bearings 5 and 8 have lateral and longitudinal axes respectively although universal or ball joints may be preferred. The engine 10 is mounted atop the fuselage 7 driving the mast 3 and rotor 4 through a self-aligning drive shaft 11 and transmission 2. The bearings 5, support arms 6, bearings 8 and brackets 9, are laterally disposed on opposite sides of the pylon 1 and are so arranged, as shown in FIGURE 2, that two planes, each formed by the two points of attachment of the support arms 6 to the fuselage 7 and the single point of attachment of the support arms 6 to the transmission 2, intersect on a line or axis *a—a* which passes through the center of gravity of the fuselage.

With the construction described above, the pylon system is laterally restricted to rotate around a preselected axis (*a—a*) extending generally longitudinally of the craft that contains the center of gravity of the fuselage. By thus restricting the pylon's lateral motion to motion around the center of gravity of the fuselage, a lateral moment input to the fuselage from the pylon is avoided.

As seen in FIGURE 1, the axis *a—a* is inclined from a horizontal or water line of the aircraft. This can be achieved by the disposition of the component attachment locations as shown in FIGURE 2, wherein the two forward attachment locations between the support arms and the fuselage are each laterally displaced from the center line or mast of the aircraft a greater amount than the aft attachment locations. For a clear understanding of the geometry involved, reference may be had to FIGURE 4 which illustrates the relationship involved in isometric form. The horizontal plane can be understood to be the equivalent of the plane indicated by the line through the four attachment points or bearings 8 of FIGURES 1 and 2, and it should be clear therefrom that the proper disposition of the support arm-to-fuselage attachment points indicated in FIGURES 1 and 2 can result in the inclination of the line of intersection or axis *a—a* between the two planes as illustrated in FIGURE 1.

The degree of inclination of axis *a—a* is established so that the "resultant torque vector" for any particular rotary wing aircraft—shown and so labeled in FIGURE 1 and constituting the summation of the torque input from the engine through the shaft to the transmission, the torque output from the transmission through the mast to the rotor, and the lateral component of the rotor flapping (to compensate for tail rotor thrust)—is perpendicular or substantially perpendicular to the axis a—a. It will be recognized that this resultant torque vector is made up of component torque vectors which are primarily dependent on the engine torque so that the resultant torque of these vectors, for each particular aircraft, will have a predetermined angular displacement from the vertical under normal flight conditions. Thus it is possible to select and maintain a perpendicular or substantially perpendicular relationship between the resultant torque vector and the axis a—a.

The desirability of this perpendicular relationship is perhaps best explained by indicating the undesirable effect that would exist in its absence. Consider in FIGURE 2, that the attachment points 8 are all disposed equidistant laterally from the longitudinal center line, or mast. The axis a—a would then be located along a horizontal or water line and at an angle to the resultant torque vector which is inclined with respect to the vertical, as shown in FIGURE 1. The fact that there is other than a perpendicular relationship between the resultant torque vector and the axis a—a, means, as can be appreciated by application of the conventional left-hand rule, that there would be force components tending to rotate the system laterally around axis a—a, as shown in FIGURE 5. The more acute the angle the larger these forces as, for purposes of emphasis, it can be readily appreciated that if the axis a—a were parallel to or coincidental with the resultant torque vector the entire resultant torque would act to rotate the system around axis a—a, with resulting pylon deflection and misalignment of the engine drive shaft 11. It should be appreciated that rotor forces in the lateral plane have a greater effect on fuselage vibrations than forces in the longitudinal plane because fuselage inertia is less in the lateral plane. Thus, in the less sensitive longitudinal plane, as illustrated in FIGURES 1 and 2, pylon motion is restricted to rotation around the axis b—b. However, this axis can be optimumly selected for different configurations at various points and, regardless of its disposition, the corresponding longitudinal axis a—a can be maintained or "focused" at the center of gravity of the fuselage. In the configuration herein illustrated, the axis b—b intersects the axis of the self-aligning drive shaft, resulting in minimal sliding action of the misalignment coupling of the drive shaft. An alternate location of the axis b—b might be the center of gravity of the pylon system which would tend to more effectively isolate pylon longitudinal vibrations from the fuselage.

The mounting system described herein can be referred to as a "positive focusing" mounting system by virtue of its capability to positively focus and maintain an axis of rotation at any desired point. While the preferred embodiment herein illustrated and described locates the axis a—a so that it passes through the center of gravity of the fuselage, other considerations may make it desirable to locate this axis elsewhere and it should be clear that this can very easily be accomplished.

The structure thus far described does not restrain the pylon from rotating relative to the fuselage in the longitudinal and lateral planes, but rather controls or fixes the location of the axes of rotation in these planes. However, this same positive focusing mounting system restrains the pylon system from rotation around its own vertical axis and about the axis of the engine driveshaft, and from vertical and lateral translation relative to the fuselage 7, such restraints being advantageous.

Vertical forces originating at the rotor hub can be most effectively isolated through either very high or very low vertical stiffness of the pylon attachment to the fuselage. As static load requirements prohibit the use of a very low vertical stiffness, it is desirable to use a very high pylon-fuselage attachment vertical stiffness. The present invention facilitates this as the mount is, in the vertical direction, rigidly attached to the fuselage, and a great deal of freedom is permitted in selection of the attachment points to the fuselage so as to provide a rigid vertical load path. Specifically, to achieve this vertical stiffness, the support arms 6 should be attached to the fuselage 7 in the region of primary structure.

To provide partial restraint against rotation of the pylon around the axes a—a and b—b, a rubber vibration isolation mount 12 may be attached to a lug 13 attached to the pylon system 1. The mount 12 can be constructed in accordance with well known principles to avoid that degree of elasticity tending to excite resonant rotor frequencies, to provide sufficient stiffness to prevent undue deflection of the pylon system and to be soft enough to possess good isolation qualities. Determination of the required qualities of mount 12 is readily achieved with the present invention because the centers of rotation of the pylon system in both the lateral and longitudinal planes are strictly maintained, forcing the pylon to execute rigid body motions around these axes irrespective of the flight condition or rotor hub forces, or frequency of occurrence thereof.

A static stop 14 limits excessive motion of the pylon system which would otherwise take place as a result of severe maneuvers, landing impact, etc.

Whereas only one specific form of the construction has been shown and illustrated herein, it will be understood that the invention is not so limited but that various changes may be made therein without departing from the spirit of the invention or the scope of the appended claims.

We claim:

1. In a rotary wing aircraft having
    a fuselage,
    power drive means,
    a pylon extending from said fuselage comprising
        a rotor,
        a mast attached to said rotor,
        a transmission connected to said mast adapted to drive it, and
        means for transmitting power from said power drive means to said transmission, and
        a pylon mounting system for said pylon comprising
            two inverted V-shaped members each formed by two support arms extending upwardly from said fuselage on opposing sides of said pylon,
            pivotal attachments connecting said pylon to the upper end of said members, and pivotal attachments connecting the lower ends of said support arms to the fuselage,
            said pivotal attachments on one side of said pylon defining a plane which intersects a plane defined by the attachments on the other side of the pylon on a line extending through the center of gravity of the fuselage.

2. In a rotary wing aircraft having a
    fuselage,
    power drive means,
    a pylon extending from said fuselage comprising
        a rotor,
        a mast attached to said rotor,
        a transmission connected to said mast adapted to drive it, and
        means for transmitting power from said power drive means to said transmission, and
        a pylon mounting system for said pylon comprising
            two inverted V-shaped members each formed by two support arms extending upwardly from said fuselage on opposing sides of
said pylon,
pivotal attachments connecting said pylon to
the upper end of said members, and
pivotal attachments connecting the lower ends
of said support arms to the fuselage,
said pivotal attachments on one side of said
pylon defining a plane which intersects a
plane defined by the attachments on the
other side of the pylon on a line extending
through the center of gravity of the fuselage
and substantially perpendicular to the resultant torque vector of the power drive
means and the rotor torques in normal powered flight.

3. In a rotary wing aircraft having a
fuselage,
power drive means,
a pylon extending from said fuselage comprising
a rotor,
a mast attached to said rotor,
a transmission connected to said mast adapted to
drive it, and
means for transmitting power from said power
drive means to said transmission, and
a pylon mounting system for said pylon comprising
two inverted V-shaped members each formed
by two support arms extending upwardly
from said fuselage on opposing sides of
said pylon,
pivotal attachments connecting said pylon to
the upper end of said members, and
pivotal attachments connecting the lower ends
of said support arms to the fuselage,
whereby said pivotal attachments establish a
generally longitudinal axis of rotation for
said pylon extending through the center of
gravity of the fuselage.

4. In a rotary wing aircraft, a rotor mounting system
comprising
a fuselage,
a power drive means,
a pylon extending from said fuselage comprising
a mast,
a rotor connected to said mast, and
a transmission connected to said mast and to the
power drive means, and
a pylon mounting system comprising
a plurality of mounting members with pivotal
interconnections to said pylon and said
fuselage, said pivotal interconnections on
either side of the pylon defining two planes
that intersect on a line extending through
the center of gravity of said fuselage, whereby said pylon is restricted in at least one
direction of rotation around said center of
gravity.

5. In a rotary wing aircraft, a rotor mounting system
comprising
a fuselage,
a power drive means,
a pylon extending from said fuselage comprising
a mast,
a rotor connected to said mast, and
a transmission connected to said mast and to the
power drive means, and
a pylon mounting system comprising
a plurality of mounting members with pivotal
interconnections to said pylon and said fuselage, said pivotal interconnections on either
side of the pylon defining two planes that
intersect on a line extending through the
center of gravity of the fuselage substantially perpendicular to the resultant torque
vector of the power drive means and rotor
torques in normal flight, whereby said pylon
is restricted in at least one direction of
rotation around said center of gravity.

6. In a rotary wing aircraft, a rotor mounting system
comprising
a fuselage,
a power drive means,
a pylon extending from said fuselage comprising
a mast, a rotor connected to said mast, and a
transmission connected to said mast and to the
power drive means, and
a pylon mounting system comprising
a plurality of mounting members with pivotal
interconnections to said pylon and said
fuselage, said pivotal interconnections establishing a generally longitudinal axis of rotation for said pylon extending through the
center of gravity of said fuselage whereby
said pylon is restricted in at least one direction of rotation around said center of gravity.

7. In a rotary wing aircraft having
a fuselage,
an engine,
a pylon system having a rotor, a mast and transmission
means,
said pylon system extending above said fuselage and
supporting said rotor, mast and transmission means,
and
an input drive shaft interconnecting said engine and
said transmission, and
a pylon mounting system comprising
a plurality of support members positioned adjacent to said pylon system, said support members pivotally attached at one end to said pylon
system and at the other end to said fuselage,
said attachments on either side of said pylon establishing two planes intersecting on a line extending through the center of gravity of said
fuselage.

8. In a rotary wing aircraft having
a fuselage,
an engine,
a pylon system having a rotor, a mast and transmission
means,
said pylon system extending above said fuselage and
supporting said rotor, mast and transmission means,
and
an input drive shaft interconnecting said engine and
said transmission, and
a pylon mounting system comprising
a plurality of support members positioned adjacent to said pylon system, said support members pivotally attached at one end to said pylon
system and at the other end to said fuselage,
said attachments on either side of said pylon establishing two planes intersecting on a line extending through the center of gravity of said
fuselage and substantially perpendicular to the
resultant torque vector of the engine and rotor
torques in normal flight.

9. In a rotary wing aircraft having
a fuselage,
a power drive means,
a pylon extending from said fuselage comprising
a rotor, and
means for transmitting torque from said power
drive means to said rotor, and
a pylon mounting for said pylon comprising
support means extending between said fuselage and pylon on laterally opposed sides
thereof, said support means pivotally attached to the fuselage and pylon, and
said pivotal attachments on either side of the
pylon defining two planes that intersect on ity of said fuselage.

10. In a rotary wing aircraft having
a fuselage,
a power drive means,
a pylon extending from said fuselage comprising
    a rotor, and
    means for transmitting torque from said power drive means to said rotor, and
    a pylon mounting for said pylon comprising
        support means extending between said fuselage and pylon on laterally opposed sides thereof, said support means pivotally attached to the fuselage and pylon, and
        said pivotal attachments on either side of the pylon defining two planes that intersect on a line extending through the center of gravity of said fuselage and substantially perpendicular to the resultant torque vector of the power drive means and rotor torques in normal flight.

11. In a rotary wing aircraft having
a fuselage,
a power drive means,
a pylon extending from said fuselage comprising
    a rotor, and
    means for transmitting torque from said power drive means to said rotor, and
    a pylon mounting for said pylon comprising
        support means extending between said fuselage and pylon on laterally opposed sides thereof, said support means pivotally attached to the fuselage and pylon, and said pivotal attachments for said pylon establishing a generally longitudinal axis of rotation for said pylon, which axis extends through the center of gravity of said fuselage.

12. In a rotary wing aircraft, a rotor mounting system comprising
a fuselage,
a power drive means,
a pylon extending from said fuselage comprising
    a mast,
    a rotor connected to said mast, and
    a transmission connected to said mast and to the power drive means, and
    a pylon mounting system comprising
        a plurality of mounting members with pivotal interconnections to said pylon and said fuselage, said pivotal interconnections defining two planes that intersect on a line whereby, in a plane perpendicular to said line, said pylon is restricted to rotation around said line.

13. In a rotary wing aircraft, a rotor mounting system comprising
a fuselage,
a power drive means,
a pylon extending from said fuselage comprising
    a mast,
    a rotor connected to said mast, and
    a transmission connected to said mast and to the power drive means, and
    a pylon mounting system comprising
        a plurality of mounting members with pivotal interconnections to said pylon and said fuselage, said pivotal interconnections defining two planes that intersect on a line whereby, in a plane perpendicular to said line, said pylon is restricted to rotation around said line, said line extending substantially perpendicular to the resultant torque vector of the power drive means and rotor torques in normal flight.

14. In a rotary wing aircraft having
a fuselage,
a power drive means,
a pylon extending from said fuselage comprising
    a rotor, and
    means for transmitting torque from said power drive means to said rotor, and
    a pylon mounting for said pylon comprising
        support means extending between said fuselage and pylon on laterally opposed sides thereof, said support means pivotally attached to the fuselage and pylon, and
        said pivotal attachments on either side of the pylon defining two planes that intersect on a line, whereby, in a plane perpendicular to said line, said pylon is restricted to rotation around said line.

15. In a rotary wing aircraft having
a fuselage,
a power drive means,
a pylon extending from said fuselage comprising
    a rotor, and
    means for transmitting torque from said power drive means to said rotor, and
    a pylon mounting for said pylon comprising
        support means extending between said fuselage and pylon on laterally opposed sides thereof, said support means pivotally attached to the fuselage and pylon, and
        said pivotal attachments on either side of the pylon defining two planes that intersect on a line, whereby, in a plane perpendicular to said line, said pylon is restricted to rotation around said line, said line extending substantially perpendicular to the resultant torque vector of the power drive means and rotor torques in normal flight.

16. In a rotary wing aircraft, a rotor mounting system comprising
a fuselage,
a power drive means,
a pylon extending from said fuselage comprising
    a mast, a rotor connected to said mast, and a transmission connected to said mast and to the power drive means, and
    a pylon mounting system comprising
        a plurality of mounting members with pivotal interconnections to said pylon and said fuselage, said pivotal interconnections establishing a generally longitudinal axis of rotation for said pylon extending through the center of gravity of said fuselage whereby said pylon is restricted in at least one direction of rotation around said center of gravity, and said pivotal interconnections to said pylon defining a generally lateral axis, whereby, in a plane perpendicular to said lateral axis, said pylon is restricted to rotation around said lateral axis.

17. In a rotary wing aircraft, a rotor mounting system comprising
a fuselage,
a power drive means,
a pylon extending from said fuselage comprising
    a mast,
    a rotor connected to said mast, and
    a transmission connected to said mast and to the power drive means, and
    a pylon mounting system comprising
        a plurality of mounting members with pivotal interconnections to said pylon and said fuselage, said pivotal interconnections establishing a generally longitudinal axis of rotation displaced vertically with respect to the area defined by said pivotal interconnections whereby, in a plane perpendicular to said axis, said pylon is restricted to rotation around said axis.

18. In a rotary wing aircraft having
   a fuselage,
   a power drive means,
   a pylon extending from said fuselage comprising
      a rotor, and
      means for transmitting torque from said power drive means to said rotor, and
   a pylon mounting for said pylon comprising
      support means extending between said fuselage and pylon on laterally opposed sides thereof, said support means pivotally attached to the fuselage and pylon, and said pivotal attachments establishing a generally longitudinal axis of rotation displaced vertically with respect to the area defined by said pivotal attachments whereby, in a plane perpendicular to said axis, said pylon is restricted to rotation around said axis.

19. In a rotary wing aircraft, a rotor mounting system comprising
   a fuselage,
   a power drive means,
   a pylon extending from said fuselage comprising
      a mast,
      a rotor connected to said mast, and
      a transmission connected to said mast and to the power drive means, and
   a pylon mounting system comprising
      a plurality of mounting members with pivotal interconnections to said pylon and said fuselage, said pivotal interconnections establishing a generally longitudinal axis of rotation displaced vertically with respect to the area defined by said pivotal interconnections whereby, in a plane perpendicular to said longitudinal axis, said pylon is restricted to rotation around said axis and said pivotal interconnections to said pylon defining a generally lateral axis, whereby, in a plane perpendicular to said lateral axis, said pylon is restricted to rotation around said lateral axis.

References Cited by the Examiner

UNITED STATES PATENTS

| | | | |
|---|---|---|---|
| 1,923,110 | 8/33 | Morse | 244—17.27 |
| 2,569,882 | 10/51 | Bothezat | 244—17.27 X |
| 2,615,657 | 10/52 | Young et al. | 244—17.27 |
| 3,118,504 | 1/64 | Cresap | 244—17.27 X |

FERGUS S. MIDDLETON, *Primary Examiner.*